(12) United States Patent
Ghuman

(10) Patent No.: US 10,999,658 B2
(45) Date of Patent: May 4, 2021

(54) OPTICAL COMMUNICATIONS MODULE LINK EXTENDER BACKHAUL SYSTEMS AND METHODS

(71) Applicant: Cox Communications, Inc., Atlanta, GA (US)

(72) Inventor: Harjinder S. Ghuman, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 16/569,422

(22) Filed: Sep. 12, 2019

(65) Prior Publication Data
US 2021/0084395 A1  Mar. 18, 2021

(51) Int. Cl.
*H04Q 11/00* (2006.01)
(52) U.S. Cl.
CPC ..... *H04Q 11/0067* (2013.01); *H04Q 11/0005* (2013.01); *H04Q 2011/0016* (2013.01); *H04Q 2011/0088* (2013.01)
(58) Field of Classification Search
CPC .................................................. H04J 14/0286
See application file for complete search history.

(56) References Cited

U.S. PATENT DOCUMENTS

| 5,663,818 | A  | 9/1997  | Yamamoto et al. |
| 5,664,131 | A  | 9/1997  | Sugiya |
| 5,742,416 | A  | 4/1998  | Mizrahi |
| 5,995,256 | A  | 11/1999 | Fee |
| 5,995,259 | A  | 11/1999 | Meli et al. |
| 6,323,994 | B1 | 11/2001 | Li et al. |
| 6,392,790 | B1 | 5/2002  | Lauder et al. |
| 6,414,769 | B1 | 7/2002  | Meli et al. |
| 6,493,133 | B1 | 12/2002 | Liang et al. |
| 6,519,060 | B1 | 2/2003  | Liu |
| 6,570,703 | B2 | 5/2003  | Murakami et al. |
| 6,580,548 | B2 | 6/2003  | Islam |
| 6,606,427 | B1 | 8/2003  | Graves et al. |
| 6,961,522 | B1 | 11/2005 | Castagnetti et al. |
| 6,973,268 | B1 | 12/2005 | Thompson |
| 7,106,969 | B1 | 9/2006  | Lichtman et al. |

(Continued)

OTHER PUBLICATIONS

H. Ghuman, "DWDM Access for Remote PHY Networks Integrated Optical Communications Module (OCML)", Fall 2017.*
(Continued)

*Primary Examiner* — Shi K Li
(74) *Attorney, Agent, or Firm* — Eversheds Sutherland (US) LLP

(57) ABSTRACT

This disclosure relates to systems and devices related to multiplexing optical data signals. A method may be disclosed for transporting optical data signals. The method may comprise transmitting, by a master terminal center (MTC) comprising a spine switch, the optical data signal to a coherent transport chassis. The method may comprise transmitting, by the coherent transport chassis, the optical data signal to a leaf switch of a secondary terminal center (STC). The method may comprise transmitting, by the leaf switch, the optical data signal to an optical communications module link extender (OCML) in the STC. The method may comprise transmitting, by the OCML, the optical data signal to a dense wave division multiplexer (DWDM).

20 Claims, 8 Drawing Sheets

(56) References Cited

U.S. PATENT DOCUMENTS

| | | |
|---|---|---|
| 7,239,772 B2 | 7/2007 | Wang et al. |
| 7,505,687 B2 | 3/2009 | Jaggi et al. |
| 7,509,048 B2 | 3/2009 | Turpin et al. |
| 7,565,081 B1 | 7/2009 | Britz et al. |
| 7,773,838 B2 | 8/2010 | Lee et al. |
| 7,796,886 B2 | 9/2010 | Jaggi et al. |
| 7,805,073 B2 | 9/2010 | Sabat et al. |
| 8,116,629 B2 | 2/2012 | Boduch et al. |
| RE43,403 E | 5/2012 | Jaggi et al. |
| 3,238,751 A1 | 8/2012 | Iannone et al. |
| 8,320,759 B2 | 11/2012 | Boduch |
| 8,873,963 B2 | 10/2014 | Handelman |
| 8,897,639 B2 | 11/2014 | Trojer et al. |
| 9,014,557 B2 | 4/2015 | Graves et al. |
| 9,172,492 B2 | 10/2015 | Lee |
| 10,211,920 B1 | 2/2019 | Khaleghi et al. |
| 10,541,774 B1 | 1/2020 | Dai |
| 2001/0015843 A1 | 8/2001 | Miyauchi et al. |
| 2001/0019449 A1 | 9/2001 | Krummrich |
| 2002/0000346 A1 | 1/2002 | Baranda et al. |
| 2002/0003646 A1 | 1/2002 | Ishikawa |
| 2002/0024706 A1 | 2/2002 | Meli |
| 2002/0048066 A1 | 4/2002 | Antoniades et al. |
| 2002/0089719 A1 | 7/2002 | Joo et al. |
| 2002/0141046 A1 | 10/2002 | Joo et al. |
| 2002/0163691 A1 | 11/2002 | Wong et al. |
| 2002/0181048 A1 | 12/2002 | Kuykendall et al. |
| 2003/0076560 A1 | 4/2003 | Pratt et al. |
| 2003/0142978 A1 | 7/2003 | Lee et al. |
| 2003/0194242 A1 | 10/2003 | Miyauchi et al. |
| 2004/0184804 A1 | 9/2004 | Shahar |
| 2004/0252996 A1 | 12/2004 | McNicol |
| 2005/0141892 A1 | 6/2005 | Park et al. |
| 2005/0158049 A1 | 7/2005 | Lee et al. |
| 2005/0286896 A1 | 12/2005 | Kinoshita et al. |
| 2006/0045528 A1 | 3/2006 | Gumaste et al. |
| 2006/0104638 A1 | 5/2006 | Chung et al. |
| 2006/0165412 A1 | 7/2006 | Jung et al. |
| 2007/0019956 A1 | 1/2007 | Sorin et al. |
| 2007/0212072 A1 | 9/2007 | Iannone et al. |
| 2008/0089684 A1 | 4/2008 | Smith et al. |
| 2009/0010648 A1 | 1/2009 | Zuhdi et al. |
| 2009/0074417 A1 | 3/2009 | Vassilieva et al. |
| 2009/0129774 A1 | 5/2009 | Jaggi et al. |
| 2009/0208212 A1 | 8/2009 | Lee et al. |
| 2009/0220231 A1 | 9/2009 | Zimmel et al. |
| 2009/0297152 A1 | 12/2009 | Bainbridge et al. |
| 2010/0046946 A1 | 2/2010 | Cao et al. |
| 2010/0054740 A1 | 3/2010 | Lee et al. |
| 2010/0119223 A1 | 5/2010 | Ferrari et al. |
| 2010/0189442 A1 | 7/2010 | Grobe |
| 2010/0239257 A1 | 9/2010 | Grossman et al. |
| 2010/0266283 A1 | 10/2010 | Beckett |
| 2010/0278535 A1 | 11/2010 | Kim |
| 2010/0316386 A1 | 12/2010 | Luk et al. |
| 2011/0158650 A1 | 6/2011 | Cavaliere et al. |
| 2011/0299858 A1 | 12/2011 | Mazzini et al. |
| 2012/0020668 A1 | 1/2012 | Trojer et al. |
| 2012/0087648 A1 | 4/2012 | Gao et al. |
| 2012/0148245 A1 | 6/2012 | Bowler et al. |
| 2012/0315047 A1 | 12/2012 | Iannone et al. |
| 2013/0039656 A1 | 2/2013 | Lam et al. |
| 2013/0057948 A1 | 3/2013 | Simonneau et al. |
| 2013/0084064 A1 | 4/2013 | Akasaka |
| 2013/0266318 A1 | 10/2013 | Manaf et al. |
| 2014/0099117 A1 | 4/2014 | Way |
| 2014/0161446 A1 | 6/2014 | Lee et al. |
| 2014/0233954 A1 | 8/2014 | Lee et al. |
| 2015/0043919 A1 | 2/2015 | Handelman |
| 2015/0139654 A1 | 5/2015 | Mandelbaum et al. |
| 2015/0249314 A1 | 9/2015 | Onaka |
| 2015/0249520 A1 | 9/2015 | Badar et al. |
| 2015/0304033 A1 | 10/2015 | Giorgi et al. |
| 2016/0087747 A1 | 3/2016 | Way |
| 2016/0192043 A1 | 6/2016 | Shukunami et al. |
| 2016/0197697 A1 | 7/2016 | Bonk et al. |
| 2017/0134113 A1 | 5/2017 | Lam et al. |
| 2017/0237483 A1 | 8/2017 | Barnard |
| 2018/0212706 A1 | 7/2018 | Ghuman |
| 2018/0261971 A1 | 9/2018 | Yaman et al. |
| 2019/0036802 A1* | 1/2019 | Kuttuva Jeyaram ... H04L 43/12 |
| 2019/0132049 A1* | 5/2019 | Cai ................. H04J 3/1611 |
| 2019/0140765 A1 | 5/2019 | Ghuman |
| 2019/0181952 A1 | 6/2019 | Jia et al. |
| 2019/0215091 A1 | 7/2019 | Johansson |
| 2020/0099546 A1* | 3/2020 | Haag ............... H04L 41/0896 |

OTHER PUBLICATIONS

Ghuman, H., "Coherent Access Applications for MSOs", SCTE/ISBE, 2018. (23 pages).

Bindhaiq, et al., Recent Development on Time and Wavelength-Division Multiplexed Passive Optical Network (TWDM-PON) for Next-Generation Passive Optical Network Stage 2 (NG-PON2), Optical Switching and Networking 15, 2015. (14 pages).

\* cited by examiner

OPTICAL COMMUNICATIONS MODULE LINK EXTENDER BACKHAUL SYSTEMS AND METHODS

FIELD OF INVENTION

This disclosure relates generally to the field of optical telecommunications and includes an integrated module with several sub-assemblies.

BACKGROUND

To understand the importance of optical networking, the capabilities of this technology have to be discussed in the context of the challenges faced by the telecommunications industry, and, in particular, service providers. Most U.S. networks were built using estimates that calculated bandwidth use by employing concentration ratios derived from classical engineering formulas for modeling network usage such as the Poisson process. Consequently, forecasts of the amount of bandwidth capacity needed for data networks were calculated on the presumption that a given individual would only use network bandwidth six minutes of each hour. These formulas did not factor in the amount of traffic generated by different devices accessing the Internet. With the advent of the Internet and the ever increasing number of devices (e.g., facsimile machines, multiple phone lines, modems, teleconferencing equipment, mobile devices including smartphones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this growth of devices, a large amount of bandwidth capacity is needed to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However, today, if one million families in a city decided to view a video on a Website, then network transmission rates on the order of terabits are required. With a transmission rate of one terabit, it is possible to transmit 200 million simultaneous full-duplex phone calls or transmit the text from 300 years-worth of daily newspapers per second.

DETAILED DESCRIPTION

Figure 1:
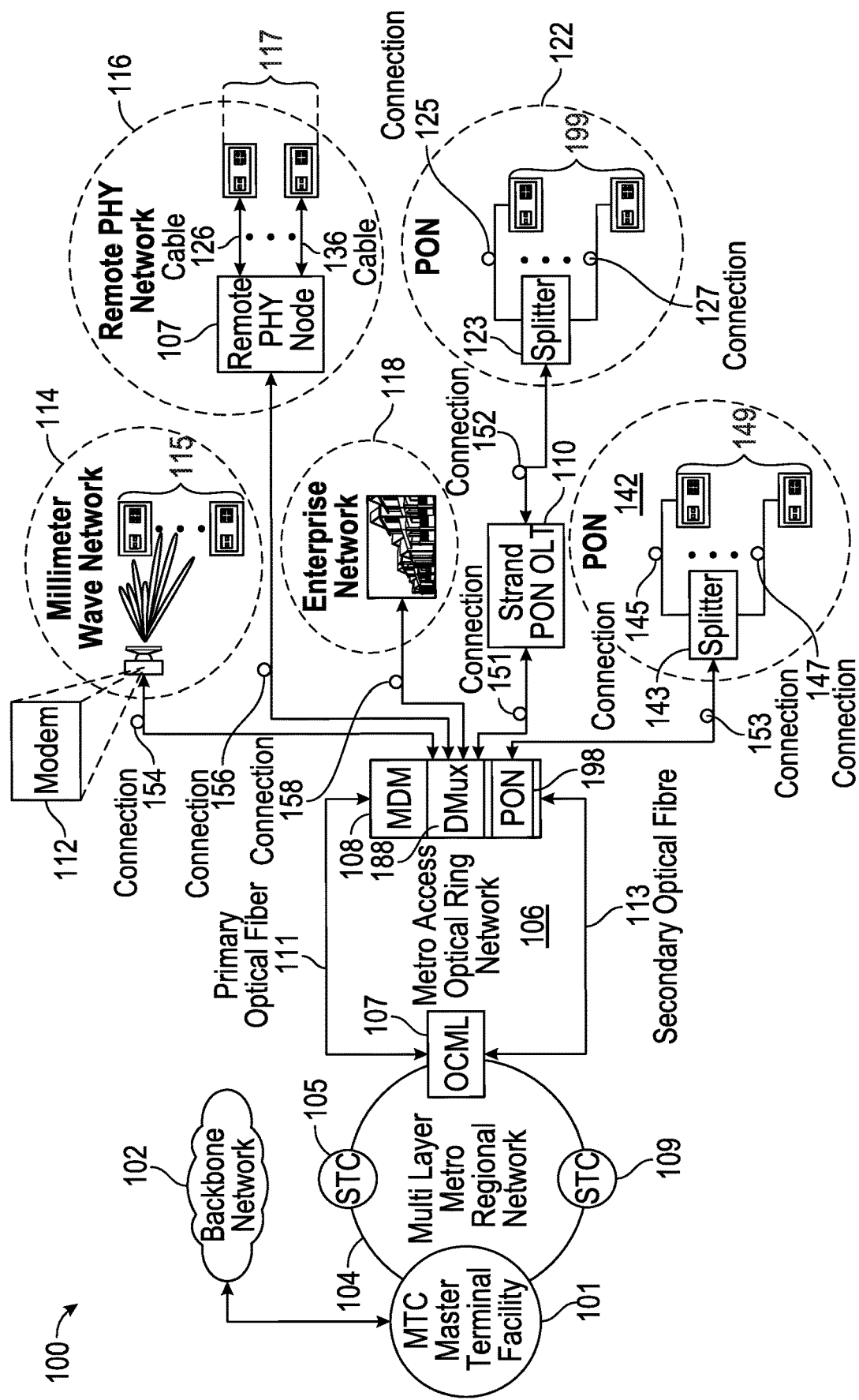
FIG. 1 depicts a metro access network architecture, in accordance with the disclosure.

Using an optical communication module link extender (OCML), as described herein, a network can be created that backhauls a plurality of coherent optical data signals from a secondary transport center (STC) to a master terminal center (MTC) in accordance with the present disclosure. In some embodiments the OCML backhaul can be implemented via a multiplexer-demultiplexer (MDM) unit, or a combination of the MDM and OCML. Houses, apartment complexes, office buildings, industrial buildings, can be connected to the STC via an outside plant that is responsible for aggregating all of the optical data signals from the houses, apartment complexes, office buildings, industrial buildings. After the STC receives the aggregated optical data signals, the STC can create a coherent optical data signal using the OCML to efficiently transmit the aggregated optical data signals to the MTC where the coherent optical data signals are processed. For example, a set top box (STB), or other suitable device, in an office building can request video footage from a web server connected to the MTC via metropolitan network, and the MTC can fetch the requested video footage from the web server and send the video footage back to the STB.

The OCML backhaul can be implemented without having to modify a service provider's metro network and its associated expensive reconfigurable optical add-drop multiplexers (ROADMs). This can reduce the cost of bringing OCML solutions to a service provider's network. Furthermore, an OCML backhaul may use just two bi-directional fibers instead of the four, which is oftentimes used in a service provider's metro network. The two bi-directional fibers may run in opposite directions (e.g., two bi-directional fibers running north and south, or two bi-directional fibers running east and west).

OCML backhaul may be a direct backhaul link and may reduce the latency experienced throughout a service provider network that uses a metro ring network configuration where coherent equipment may pass through several ROADMs and have a bigger impact on the latency. To this end, the OCML backhaul circuits disclosed herein allow a service provider to eliminate costly ROADMs and decrease latency. The decrease in latency may be realized because there are less pieces of equipment (e.g., ROADMs) that an optical signal must pass through, thereby eliminating the time spent by the ROADMs processing an optical data signal it receives before transmitting to the next ROADM or another piece of equipment connected to the ROADM.

When largescale data networks providing residential, commercial, and enterprise customers with Internet access were first deployed, the unprecedented growth in the number of devices accessing the network could not have been imagined. As a result, the network growth requirements needed to meet the demand of the devices were not considered at that time either. For example, from 1994 to 1998, it is estimated that the demand on the U.S. interexchange carriers' (IXC's) network would increase sevenfold, and for the U.S. local exchange carriers' (LEC's) network, the demand would increase fourfold. For instance, some cable companies indicated that their network growth was 32 times greater than the previous year, while other cable companies have indicated that the size of their networks have doubled every six months in a four-year period.

In addition to this explosion in consumer demand for bandwidth, many service providers are coping with optical fiber exhaust in their network. For example, in 1995 alone many (ISP) companies indicated that the amount of embedded optical fibers already in use at the time was between 70 percent and 80 percent (i.e., 70 to 80 percent of the capacity of their networks were used most of the time to provide service to customers). Today, many cable companies are nearing one hundred percent capacity utilization across significant portions of their networks. Another problem for cable companies is the challenge of deploying and integrating diverse technologies on physical infrastructure. Customer demands and competitive pressures mandate that carriers offer diverse services economically, and deploy them over the embedded network. One potential technology that meets these requirements is based on multiplexing a large and diverse number of data, regardless of the type of data, onto a beam of light that may be attenuated to propagate at different wavelengths. The different types of data may comprise facsimile sources, landline voice sources, voice over Internet Protocol (VOIP) sources, video sources, web browser sources, mobile device sources including voice application sources, short messaging service (SMS) application sources, multimedia messaging service (MMS) application sources, mobile phone third-party application (app) sources, and/or wearable device sources. When a large and diverse number of data sources, such as the ones mentioned in the previous sentence, are multiplexed together over light beams transmitted on an optical fiber, it may be referred to as a dense wave division multiplexing (DWDM).

The use of an optical communications module link extender (OCML) (e.g., coherent OCML backhaul) circuit as described herein allows cable companies to offer these services regardless of the open systems interconnection (OSI) model network layer (layer 3) protocols or media access control (MAC) (layer 2) protocols that are used by the different sources to transmit data. For example, email, video, and/or multimedia data such as web-based content data, may generate IP (layer 3) data packets that are transmitted in asynchronous transfer mode (ATM) (layer 2) frames. Voice (telephony) data may be transmitted over synchronous optical networking (SONET)/synchronous digital hierarchy (SDH). Therefore, regardless of which layer is generating data (e.g., IP, ATM, and/or SONET/SDH), a DWDM passive circuit provides unique bandwidth management by treating all data the same. This unifying capability allows cable companies with the flexibility to meet customer demands over a self-contained network.

A platform that can unify and interface with these technologies and position the cable company with the ability to integrate current and next-generation technologies is critical for a cable company's success.

Cable companies faced with the multifaceted challenge of increased service needs, optical fiber exhaustion, and layered bandwidth management, need options to provide economical and scalable technologies. One way to alleviate optical fiber exhaust is to lay more optical fiber, and, for those networks where the costs of laying new optical fiber are minimal, the best solution may be to lay more optical fiber. This solution may work in more rural areas, where there may be no considerable population growth. However, in urban or suburban areas laying new optical fiber may be costly. Even if it was not costly, the mere fact that more cable is being laid does not necessarily enable a cable company to provide new services or utilize the bandwidth management capabilities of the unifying optical transmission mechanism such as DWDM.

Another solution may be to increase the bit rate using time-division multiplexing (TDM). TDM increases the capacity of an optical fiber by slicing time into smaller time intervals so that more bits of data can be transmitted per second. Traditionally, this solution has been the method of choice, and cable companies have continuously upgraded their networks using different types of digital signaling technologies to multiplex data over SONET/SDH networks. For example, Digital Signal (DS) DS-1, DS-2, DS-3, DS-4, and DS-5, commonly referred to as T1, T2, T3, T4, or T5 lines, are different carrier signals, that are transmitted over SONET/SDH networks that can carry any of the sources of data mentioned above, whose data rates increase with the number assigned to the DS. That is DS-1 was the earliest carrier signal used to transmit data over SONET/SDH networks and has the lowest data rate and DS-5 is the most recent carrier signal used to transmit data over SONET/SDH networks with the highest data rate. Cable company networks, especially SONET/SDH networks, have evolved over time to increase the number of bits of data that can be transmitted per second by using carrier signals with higher data rates. However, when cable companies use this approach, they must purchase capacity based on what the SONET/SDH standard dictates will be the next increase in capacity. For example, cable companies can purchase a capacity of 10 Gbps for TDM, but should the capacity not be enough the cable companies will have to purchase a capacity of 40 Gbps for TDM, because there are no intermediate amounts of capacity for purchase. In such a situation, a cable company may purchase a significant amount of capacity that they may not use, and that could potentially cost them more than they are willing to pay to meet the needs of their customers. Furthermore, with TDM based SONET/SDH networks, the time intervals can only be reduced to a certain size beyond which it is no longer possible to increase the capacity of a SONET/SDH network. For instance, increasing the capacity of SONET/SDH networks to 40 Gbps using TDM technology may prove to be extremely difficult to achieve in the future.

DWDM passive circuits can be used in combination with one or more other optical communications devices to develop novel signal extension circuits that increase the range with which light beams are propagated and the number of signals that can be combined and transmitted from a cable company to customers. The circuits disclosed herein may be referred to as coherent optical communications module link (coherent OCML backhaul). The coherent OCML backhaul passive circuits, disclosed herein, increase the capacity of embedded optical fibers by first assigning incoming optical signals to specific frequencies (wavelength, denoted by lambda) within a designated frequency band and then multiplexing the resulting signals out onto one optical fiber. Because incoming signals are never terminated in the optical layer, the interface can be bit-rate and format independent, thereby allowing the service provider to integrate DWDM passive circuits easily into a passive circuit, such as a coherent OCML backhaul passive circuit, with existing equipment in the network while gaining access to the untapped capacity in the embedded optical fibers.

In one or more embodiments, a DWDM passive circuit combines multiple optical signals for transportation over a single optical fiber, thereby increasing the capacity of a service provider's network. Each signal carried can be at a different rate (e.g., optical carrier transmission rate OC-3, OC-12, OC-24, etc.) and in a different format (e.g., SONET, ATM, data, etc.). For example, the networks disclosed herein comprise DWDM passive circuits that transmit and receive a mix of SONET signals with different data rates (e.g., OC-48 signals with a data rate of 2.5 Gbps or OC-192 signals with a data rate of 10 Gbps) can achieve data rates (capacities) of over 40 Gbps. The coherent OCML backhaul passive circuits disclosed herein can achieve that while maintaining the same degree of system performance, reliability, and robustness as current transport systems—or even surpassing it. The coherent OCML backhaul passive circuits may be a smart platform, integrated into a network headend or a network cabinet, and may connect a metro area network that provides internet and telecommunications services to end users (e.g., enterprise multi-dwelling unit (MDU) customers, residential customers, commercial customers, and industrial customers) through one or more optical fiber links. The coherent OCML backhaul passive circuits may also be referred to as coherent OCML headends. The coherent OCML headend enables a plurality of signals to be cost-effectively transported over long optical fiber distances between 5 km and 60 km without having to put any optical amplifiers or other active devices, like an optical switch that is normally used to provide path redundancy in case of an optical fiber cut) in the field.

In one or more embodiments, the coherent OCML headend may transport a mix of multi-wavelength coherent 10 Gigabit non-return-to-zero (10GNRZ), coherent 100 Gigabit Ethernet (100 GbE), 200 GbE, and/or 400 GbE, gigabit passive optical network (GPON), and/or 10 Gigabit PON (XGPON)/10 Gigabit Ethernet PON (10GEPON) signals over the same optical fiber without having active devices such as optical amplifiers in the field. The coherent OCML headend may also configured to support the same wavelengths over a secondary optical fiber through an optical switch in case the primary optical fiber experiences a cut or otherwise inoperable. In one embodiment, a coherent OCML headend, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The coherent OCML headend may comprise a three-port or four-port wave division multiplexer (WDM) or circulator to combine and separate 10GNRZ, coherent 100 GbE, 200 GbE, and/or 400 GbE downstream and upstream signals of different wavelengths. The coherent OCML headend may also comprise a four-port WDM to combine GPON, EPON, and 10GNRZ, coherent 100 GbE, 200 GbE, and/or 400 GbE optical signals of different wavelengths, while the DWDM combines SONSET/SDH and/or ATM signals. The coherent OCML headend may also comprise a five-port WDM to combine and separate upstream and downstream signals comprising GPON, XGPON/10GEPON, and 10GNRZ, coherent 100 GbE, 200 GbE, and/or 400 GbE optical data signals of different wavelengths. Although the term multiplexer is used to describe the WDMs as disclosed herein, the WDMs do not exclusively multiplex (combine) one or more downstream signals into a single downstream signal, but they also demultiplex (separate) a single upstream signal into one or more upstream signals.

In one or more embodiments, the WDM may comprise one or more thin-film filters (TFFs) or array waveguide gratings (AWGs) that combine one or more downstream signals into a single downstream signal and separate a single upstream signal into one or more upstream signals. The WDM may comprise one or more wavelength-converting transponders, where each of the wavelength-converting transponders receives an optical data signal (e.g., a 10G NRZ, coherent 100 GbE, 200 GbE, and/or 400 GbE optical data signal) from a client-layer optical network such as a synchronous optical network (SONET)/synchronous digital hierarchy (SDH), Internet protocol (IP), and/or asynchronous transfer mode (ATM) optical network. Each of the wavelength-converting transponders converts the optical data signal into an electrical data signal and then converts the electrical data signal into a second optical data signal to be emitted by a laser, where the second optical data signal is carried by one or more packets of light oscillating with wavelengths in the c band. More specifically, each of the wavelength-converting transponders may include a laser that emits the second optical data signal. That is, each of the second optical data signals may be emitted by a laser with a unique wavelength. In some embodiments, the wavelength-converting transponders may comprise two adjacent transceivers. That is, each of the wavelength-converting transponders may comprise a first transceiver that converts the optical data signal into an electrical data signal, and may comprise second transceiver that converts the electrical data signal into the second optical data signal. The second transceiver converts the electrical signal to the second optical data signal such that the second optical data signal is transmitted with the correct wavelength.

In one or more embodiments, a first wavelength-converting transponder, of the two wavelength-converting transponders, may emit a second optical data signal with a 1550 nm wavelength. A second wavelength-converting transponder, of the two wavelength-converting transponders, may emit a second optical data signal with a 1533 nm wavelength. For example, there may be two wavelength-converting transponders, and each of the two wavelength-converting transponders may include a laser emitting a second optical data signal with a unique wavelength. Thus, each of the wavelength-converting transponders converts the electrical data signal into an optical data signal, and each of the wavelength-converting transponders emits or transmits, the optical data signal, with a wavelength in the c band, to a TFF or AWG. The TFF or AWG may combine or multiplex the optical data signals, emitted by each of the wavelength-converting transponders, into a multi-wavelength optical data signal where each of the wavelengths in the multi-wavelength optical data signal coincides with the wavelengths associated with each of the optical data signals. Returning to the example above of the two wavelength-converting transponders, the first and second wavelength-converting transponders, may each receive an optical signal from a SONET/SDH client layer network. The first and second wavelength-converting transponders may each respectively convert the optical signal they received from the SONET/SDH client layer network into an electrical data signal. The first wavelength-converting transponder may convert the electrical data signal that it receives into a second optical data signal with a first wavelength. The first wavelength-converting transponder may emit, via a first laser, the second optical data signal, with the first wavelength, to the TFF or AWG. The second wavelength-converting transponder may convert the electrical data signal that it receives into a second optical data signal with a second wavelength. The second wavelength-converting transponder may emit, via a second laser, the second optical signal, with the second wavelength, to the TFF or AWG. The TFF or AWG may combine or multiplex the second optical data signal, with the first wavelength, and the second optical data signal, with the second wavelength, onto a multi-wavelength optical signal. The TFF or AWG may be referred to as an optical multiplexer.

In one or more embodiments, the DWDM passive circuits disclosed herein may include wavelength-converting transponders and corresponding WDMs that combine or multiplex optical data signals similar to the WDMs described above. The DWDM passive circuits may also include wavelength-converting transponders and corresponding WDMs that separate optical data signals. In some embodiments, the same WDM may combine optical data signals and separate optical data signals. That is, the WDM may separate one or more optical data signals from a multi-wavelength optical data signal, or demultiplex the one or more optical data signals from the multi-wavelength optical data signal. The WDM may separate the one or more optical data signals from a multi-wavelength optical data signal using a process that is the exact opposite of the process used to combine one or more optical data signals into a multi-wavelength signal. The WDM may separate one or more optical data signals from a multi-wavelength optical data signal that may correspond to an upstream signal received from a remote DWDM passive circuit.

In one or more embodiments, the WDM may receive the multi-wavelength optical data signal and one or more TTF or AWGs may separate the one or more optical data signals, from the multi-wavelength optical data signal, using filters or waveguide gratings with properties that separate optical data signals, with different wavelengths, from a multi-wavelength optical data signal. After the WDM has separated the optical data signals, with different wavelengths, from the multi-wavelength optical data signal, the WDM may convert each of the separated optical data signals to a corresponding electrical data signal. The WDM may then convert the corresponding electrical data signal to a second optical data signal, where the second optical data signal may be an optical data signal with signal characteristics commensurate for use with a SONET/SDH, IP, or ATM client-layer optical network.

As mentioned above, the WDM may also be a circulator, or function as a circulator. The circulator in the WDM may be an optical circulator comprised of a fiber-optic component that can be used to separate upstream signals and downstream signals. The optical circulator may be a three-port or four-port device in which an optical data signal entering one port will exit the next port. The optical circulator may be in the shape of a square, with a first port on the left side of the square, a second port on the right side of the square, and a third port on the bottom side of the square. A first optical data signal (e.g., a downstream signal) entering the first port may exit the second port. A second optical data signal (e.g., an upstream signal) entering the third port may exit the first port.

In one or more embodiments, an upstream signal, as referred to herein, may be a flow of one or more packets of light, oscillating with a predetermined wavelength, along one or more optical fibers in a direction toward the coherent OCML headend from a field hub or outside plant. A downstream signal, as referred to herein, may be a flow of one or more packets of light, oscillating with a predetermined wavelength, along one or more optical fibers in a direction away from the coherent OCML headend and toward the field hub or outside plant. The one or more packets of light may correspond to one or more bits of data. Both downstream and upstream signals propagate along the same optical fiber but in opposite directions. In some embodiments, the downstream and upstream signals may propagate along the same fiber simultaneously using one or more wavelength multiplexing techniques as explained below. This bidirectional simultaneous communication between the coherent OCML headend and the outside plant may be referred to as a full duplex connection. Field hub and outside plant may be used interchangeably.

In some embodiments, the coherent OCML headend may also comprise a booster optical amplifier that amplifies downstream signals based on the length of a fiber between the coherent OCML headend and the outside plant. The booster optical amplifier may be an Erbium Doped Fiber Amplifier (EDFA). The core of the EDFA may be an erbium-doped optical fiber, which may be a single-mode fiber. The fiber may be pumped, by a laser, with one or more packets of light in a forward or backward direction (co-directional and counter-directional pumping). The one or more packets of light pumped into the fiber may have a wavelength of 980 nm. In some embodiments, the wavelength may be 1480 nm. As the one or more packets of light are pumped into the fiber, erbium ions ($Er^{3+}$) are excited and transition into a state where the ions can amplify the one or more packets of light with a wavelength within the 1.55 micrometers range. The EDFA may also comprise two or more optical isolators. The isolators may prevent light pumped into the fiber that leaves the EDFA from returning to the EDFA or from damaging any other electrical components connected to the EDFA. In some embodiments, the EDFA may comprise fiber couplers and photodetectors to monitor optical power levels. In other embodiments, the EDFA may also comprise pump laser diodes with control electronics and gain flattening filters. The EDFA could amplify each of the one or more optical data signals, while they are combined in a multi-wavelength optical data signal, without introducing any effects of gain narrowing. In particular, the EDFA may simultaneously amplify the one or more optical data signals, each of which has a different wavelength, within a gain region of the EDFA. A gain of the booster optical amplifier may be based at least in part on the length of the fiber. In some embodiments, the length of the fiber may be between 5 and 60 kilometers.

In one or more embodiments, the coherent OCML headend may also comprise an optical pre-amplifier that may amplify upstream signals. The optical pre-amplifier may also be an EDFA. The optical pre-amplifier may amplify upstream signals based on the length of the fiber between the outside plant and the coherent OCML headend to account for any loss in the strength of the upstream signals propagating along the fiber. The gain of the optical pre-amplifier may be based at least in part on a required signal strength of the upstream signals at an input to the DWDM passive circuit, in order for the DWDM to demultiplex the upstream signals. The optical pre-amplifier could amplify a multi-wavelength optical data signal, so that the one or more optical data signals in the multi-wavelength optical data signal, each of which has different respective wavelengths, have a certain received power level at a DWDM passive circuit upstream input port.

In one or more embodiments, the optical signal to noise ratio (OSNR) of the EDFA may be based at least in part on an input power to the EDFA, a noise figure. In some embodiments, the OSNR of the EDFA may be determined by the expression OSNR=58 dB−NF−$P_{in}$, where NF is the noise floor, $P_{in}$ is the input power to the EDFA. 58 dB is constant based on Planck's constant, the speed of light, the bandwidth of the EDFA, and the wavelength of the one or more packets of light. In some embodiments, the OSNR of the EDFAs disclosed herein may be as high as 40 dB, for one or more packets of light that are transmitted downstream from coherent OCML headend. The OSNR of the transceivers disclosed herein may be as low as 23 dB, and there may be a plurality of bit error rate (BER) values associated with this 23 dB OSNR. The BER may be determined based at least in part on the energy detected per bit, noise power spectral density, and a complementary error function. More specifically, the BER may be $$\frac{1}{2}\mathrm{erfc}\left(\sqrt{\frac{E_b}{N_0}}\right),$$

wherein $E_b$ is the energy detected per bit, $N_0$ is the noise power spectral density, and erfc is the complementary error function. For instance, the transceivers disclosed herein may be able to achieve a BER of $10^{-12}$ when the common logarithm ratio of received power to 1 milliwatt (mW) is −23 dBm. For example, a transceiver in the coherent OCML headend may receive an upstream flow of one or more packets of light, from a transceiver in the field hub or outside plant that has a common logarithm ratio of received power per mW of −23 dBm. The BER may be greater for common logarithm ratios of received power per mW, meaning that the BER may decrease with the higher common logarithm ratios of received power per mW. The transceivers may be configured to have greater OSNRs, and therefore lower BERs for the same value of a common logarithm ratio of received power per mW. For example, a first transceiver configured to have an OSNR of 24 dB with a common logarithm ratio of received power per mW of −28 dBm may have an approximate BER of $10^{-5}$ and a second transceiver configured to have an OSNR of 26 dB with a common logarithm ratio of received power per mW of −28 dBm may have an approximate BER of $10^{-7}$. Thus, transceivers configured to have a higher OSNR result in the transceiver having a lower BER for the same common logarithm ratio of received power per mW.

In one or more embodiments, the coherent OCML headend may also comprise an optical switch that may connect a WDM to a primary optical fiber connecting the coherent OCML backhaul passive circuit to the outside plant. The optical switch may also connect the WDM to a secondary optical fiber connecting the coherent OCML backhaul passive circuit to the outside plant. The optical switch may be in a first position that connects the WDM to the primary optical fiber and may be in a second position that connects the WDM to the secondary optical fiber. The optical switch may be in the second position when the primary optical fiber is disconnected or unresponsive.

In one or more embodiments, because the coherent OCML headend, field hub or outside plant, and fiber connecting the coherent OCML headend and field hub or outside plant mainly comprise passive optical components, in comparison to other optical ring networks that primarily have active components, one or more devices may be needed to control for dispersion of light as it goes through different optical components. In particular, as packets of light traverse the different optical components in the coherent OCML headend (e.g., WDMs and/or optical amplifiers including booster amplifiers or pre-optical amplifiers); an optical data signal being carried by the packets of light may begin to experience temporal broadening which is a form of optical data signal distortion. Because the coherent OCML backhaul systems disclosed herein may transmit high data rate optical data signals, about 10 Gbps, there may be some strong dispersive temporal broadening effects introduced by one or more of the optical components in the coherent OCML headend. The optical data signals disclosed herein may carry digital symbols, which are a series of binary digits (1 or 0), and each binary digit may be represented by a pulse of light (one or more packets of light) of a certain amplitude, that lasts a certain period. For example, an optical data signal may be carrying a plurality of digital symbols, wherein a pulse of light that has a certain amplitude and certain pulse width (certain period) represents each binary digit in a digital symbol of the plurality of digital symbols. The pulse widths of each of the pulses of light may begin to broaden as each of the pulses of light traverses different optical components. As a result, the symbol may begin to broaden. Consequently, each of the symbols begins to broaden in time and may become indistinguishable from an adjacent symbol. This may be referred to as intersymbol interference (ISI) and can make it difficult for a fiber-optic sensor or photodetector receiving the optical data signal to distinguish adjacent symbols from one another. In order to compensate for this phenomenon, a dispersion compensation module (DCM) may be inserted between one or more optical components in the coherent OCML headend. For example, a DCM may receive an optical data signal output from a WDM to compensate for any potential ISI that may be introduced as a result of different optical data signals, carried over pulses of light, that have been combined, multiplexed, or circulated in the WDM. The DCM can also compensate for dispersion characteristics of the fiber between the coherent OCML headend and the field hub or outside plant. In particular, the fiber may comprise certain optical elements or material impurities that can be compensated for in the DCM, wherein the DCM comprises long pieces of dispersion-shifted fibers or chirped fiber Bragg gratings. The dispersion-shifted fibers or chirped fiber Bragg gratings can reduce ISI introduced by the fiber. In some embodiments, the coherent OCML headend may comprise one or more DCMs to compensate for ISI that may be introduced by one or more optical components in the coherent OCML headend or fiber that is either upstream or downstream from the one or more DCMs. For example, in one embodiment, a first DCM may be positioned upstream from a first WDM, a second WDM, and third WDM.

It should be noted that the DCMs may cause negative dispersion for shorter lengths of fiber (e.g., lengths of fiber less than 5 kilometers). Negative dispersion may occur when a flow of one or more packets of light, forming a wave, propagate along a distance of the fiber with a negative rate of change. The wave propagates along the fiber, and the wave has an electric field associated with it that is normal to the direction of propagation of the wave, and a magnetic field associated with it that is normal to the electric field and the direction of propagation of the wave. The wave propagates along the fiber with an angular frequency, $\omega$, which may be a function of a propagation constant $\beta$. The electric and magnetic fields may both oscillate in accordance with sinusoidal function $e^{i(\beta z-\omega t)}$, wherein z is a distance that the wave has traveled in the fiber, and t is the time elapsed after the wave has been transmitted by the DCM. That is the electric and magnetic field may oscillate in accordance with a sinusoidal function equal to $\cos(\beta z-\omega t)+i\sin(\beta z-\omega t)$, wherein the oscillation of the wave is based at least in part on the propagation constant, and angular frequency, and the amount of time that has elapsed since the wave has been transmitted by the DCM. The angular frequency may be reciprocal of the amount of time that the electric and magnetic fields oscillate an entire cycle or period. The propagation constant may be a complex quantity, wherein the real part of the propagation constant is a measure of a change in the attenuation of the wave as it propagates along the fiber. The real part of the propagation constant may be referred to as an attenuation constant. The imaginary part of the propagation constant is a measure of a change in the phase of the wave as it propagates along the fiber. Because the angular frequency may be based at least in part on the propagation constant, the angular frequency of the wave may change as the attenuation and phase of the wave change. Accordingly, the velocity of the wave may change as it propagates along the fiber and may begin to experience dispersion. The velocity of the wave may be the rate at which the angular frequency changes as the propagation constant changes while the wave propagates along the fiber. That is the velocity of the wave may be expressed as $$v = \frac{d\omega}{d\beta}.$$

The wavelength of the wave may be expressed as $$\lambda = 2\pi \frac{c}{\omega},$$

wherein c is the speed of light. The dispersion of the wave may be based at least in part on the speed of light, wavelength of the wave, velocity of the wave, and the rate of change of the velocity of the wave with respect to the angular frequency. The dispersion of the wave may be expressed as $$D = \frac{2\pi c}{v^2 \lambda^2} \frac{dv}{d\omega}.$$

D is a dispersion parameter of the wave and is based on the speed of light (c), the velocity of the wave (v), the wavelength of the wave (λ), and the rate of change or first derivative of the velocity of the wave with respect to the angular frequency of the wave $$\left(\frac{dv}{d\omega}\right).$$

The dispersion parameter indicates whether the wave experiences positive dispersion (temporal broadening) or negative dispersion (temporal contraction) as the wave propagates along the fiber. Negative dispersion may occur when the rate of change or derivative of the velocity of the wave, with respect to the angular frequency, is negative. When $$\left(\frac{dv}{d\omega}\right)$$

is negative, the wave is said to be experiencing negative dispersion. Thus, when the rate of change of the velocity of the wave with respect to the angular frequency is negative, the wave may experience temporal contraction. Accordingly, transceivers in the transponders of the DWDM of the field hub or outside plant must be capable of detecting waves subject to negative dispersion. Negative dispersion is the opposite of positive dispersion in that ISI may not occur when a wave is detected at the transceivers in the transponders of the DWDM of the field hub or outside plant. However, temporal contraction of the wave may make it difficult for a fiber-optic sensor or photodetector to detect an optical data signal carrying digital symbols, because the digital symbols in the optical data signal may begin to overlap with one another. This may happen because each of the digital symbols are a series of binary digits, and the binary digits are represented by a pulse of light (one or more packets of light in the wave), and as the wave begins to experience negative dispersion, each of the binary digits may begin to overlap with one another. The transceivers disclosed herein are equipped with fiber-optic sensors or photodetectors that are capable of correctly detecting the one or more packets of light in the wave when the wave is subject to positive and/or negative dispersion. The DCMs disclosed herein may transmit a signal a distance of 30 kilometers.

In one or more embodiments, the coherent OCML headend may also comprise a non-optical switch that switches due to a loss of light or on demand.

In one or more embodiments, the coherent OCML headend may also comprise wavelength-monitoring ports that connect to the primary and secondary optical fibers to monitor the wavelength of upstream signals comprising 10G NRZ, coherent 100 GbE, 200 GbE, and/or 400 GbE, and/or XGPON/10GEPON signals and/or to monitor the wavelength of downstream signals comprising 10G NRZ, coherent 100 GbE, 200 GbE, and/or 400 GbE, GPON, and/or XGPON/10GEPON signals.

Certain embodiments of the disclosure are directed to a coherent OCML backhaul, systems, and methods. Embodiments of the disclosure now will be described more fully hereinafter with reference to the accompanying drawings, in which certain embodiments are shown. This disclosure may, however, be embodied in many different forms and should not be construed as limited to the embodiments set forth herein. Instead, these embodiments are provided so that this disclosure will be thorough and complete, and will fully convey the scope of the disclosure to those skilled in the art. Like numbers refer to like elements throughout.

It should be noted that the coherent OCML headend may also be referred to as a terminal or Master Terminal Center (MTC). In some embodiments, the coherent OCML headend may be collocated within the MTC. In other embodiments, the coherent OCML headend may be located at a secondary transport center (STC) that may be connected to the MTC via a network. In some embodiments, an outside plant may also be referred to as a field hub or remote physical device (RPD). In some embodiments, the outside plant may be collocated with the RPD. In other embodiments, the outside plant and RPD may not be collocated and connected via a 10 gigabit transceiver. The outside plant may comprise one or more passive optical network devices. The RPD leverages existing IP technologies such as Ethernet PON (EPON), Gigabit-capable Passive Optical Networks (GPON), and Metro Ethernet (MetroE) equipment, in order to provide Data Over Cable Systems Interface Standard (DOCSIS) services in MDUs over digital fiber to enable two-way services over cable.

FIG. 1 depicts a network architecture, in accordance with the disclosure. The network architecture may comprise an MTC Master Terminal Facility (for example MTC Master Terminal Facility 101) that may connect a cable company to the Internet through a backbone network (for example Backbone Network 102). In some embodiments, the coherent OCML backhaul may be implemented according to network architecture 100. MTC Master Terminal Facility 101 may include one or more servers hosting content that may be consumed by customer devices connected to the one or more servers via one or more networks. For example, the one or more networks may include cellular or millimeter-wave networks (for example Millimeter-Wave Network 114), remote physical networks (for example Remote PHY Network 116), enterprise networks (for example Enterprise Network 118), and one or more passive optical networks (PON) (for example PON 122 and PON 142). MTC Master Terminal Facility 101 may be connected to these one or more networks via one or more optical fibers (for example Primary Optical Fiber 111 and Secondary Optical Fiber 113). MTC Master Terminal Facility 101 may connect to the one or more optical fibers via an OCML backhaul terminal (for example, OCML backhaul terminal 107), and the one or more networks may connect to the one or more optical fibers via a multiplexer-demultiplexer (MDM) (for example MDM 108) comprising multiplexer-demultiplexer (for example DMux 188), and PON port (for example PON 198). OCML 107, Primary Optical Fiber 111, Secondary Optical Fiber 113, and MDM 108 form a network that may be referred to as the Metro Access Optical Ring Network (for example Metro Access Optical Ring Network 106). DMux 188 may multiplex optical data signals received from the one or more networks and transmit the multiplexed optical data signals to OCML 107. Conversely, DMux 188 may demultiplex optical data signals received from OCML 107 and transmit the demultiplexed optical data signals to the one or more networks. Millimeter-Wave Network 114 may be connected to DMux 188 via connection 154. Remote PHY Network 116 may be connected to DMux 188 via connection 156. Enterprise Network 118 may be connected to DMux 188 via connection 158. PON 122 may be connected to DMux 188 via connection 151. PON 142, however, may be connected to PON 198 via connection 153.

Millimeter-Wave Network 114 may comprise one or more cellular or Wi-Fi masts with one or more modems (for example Modem 112) that provide mobile devices (for example devices 115) with access to content hosted by the one or more servers at MTC Master Terminal Facility 101.

Remote PHY Network 116 may comprise one a remote physical (PHY) node (for example Remote PHY Node 107) that may comprise an optical communications interface that connects to connection 156 and a cable interface that connects to one or more cable devices (for example devices 117) via cables 126-cable 136. The one or more cable devices may be devices connecting cable set-top boxes in one or more residential, commercial, or industrial buildings to a tap at devices 117.

Enterprise Network 118 may comprise one or more offices requiring high-speed access to the Internet via Backbone Network 102 for example. Enterprise Network 118 may connect to the Internet via connection 158.

PON 122 may comprise one or more PON devices (for example devices 199) that require access to MTC Master Terminal Facility 101 or the Internet via for Backbone Network 102 for example. Devices 199 may be connected to a splitter (for example Splitter 123) via connections 125-connection 127. Splitter 123 is an optical splitter that may combine one or more optical data signals from each of devices 199 and transmit them to Strand PON optical line terminal (OLT) 110 via connection 152. Splitter 123 may also separate one or more optical data signals received from Strand PON OLT 110 via connection 152 into one or more optical data signals for each of devices 199. Strand PON OLT 110 may be an OLT that connects optical network units (ONUs) at a customer premises to DMux 188. Because one or more optical data signals can be transmitted as a multiplexed signal on a single strand of fiber, Strand PON OLT 110 may be connected to other PONs (not shown), in addition to PON 122, and may combine optical data signals received from the PONs and transmit the combined optical data signals to DMux 188. Strand PON OLT 110 may separate optical data signals received from DMux 188 into corresponding optical data signals each of which is for transmission to a corresponding PON.

PON 142 may comprise one or more PON devices (for example devices 149) that require access to MTC Master Terminal Facility 101 or the Internet via for Backbone Network 102 for example. Devices 149 may be connected to a splitter (for example Splitter 143) via connections 124-connection 147. Splitter 143 is an optical splitter that may combine one or more optical data signals from each of devices 149 and transmit them to PON 198 via connection 153. Splitter 143 may also separate one or more optical data signals received from PON 198 via connection 153 into one or more optical data signals for each of devices 149.

Figure 2:
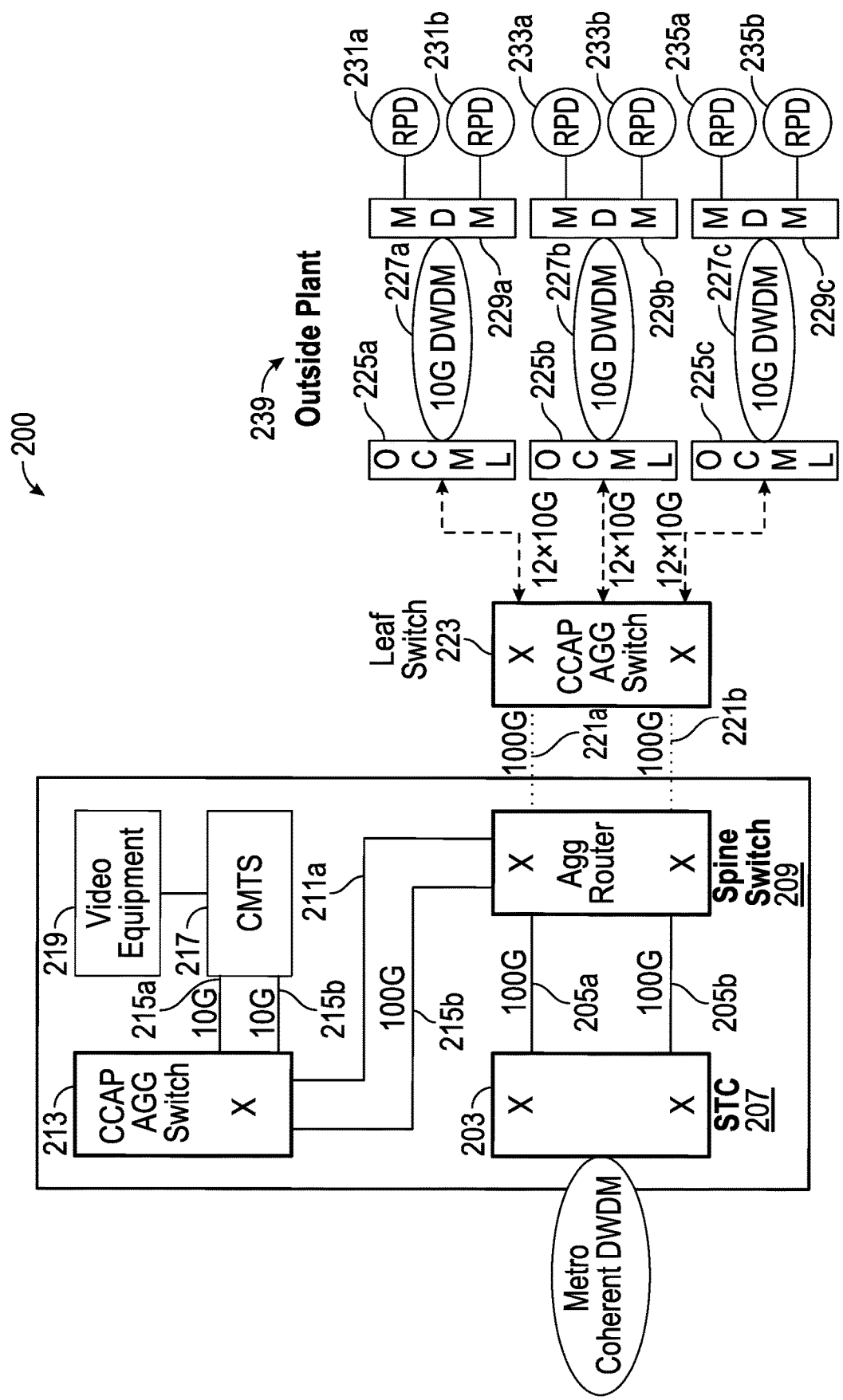
FIG. 2 depicts a network architecture including a secondary transport center (STC) and outside plant, in accordance with the disclosure.

FIG. 2 depicts a network architecture, in accordance with the disclosure. In some embodiments, the coherent OCML may be implemented according to network architecture 200. Metro Coherent DWDM 201 may be a coherent Multi-Layer Metro Regional Network similar to Multi-Layer Metro Regional Network 104 in functionality. STC 207 may comprise router 203, spine switch 209, and fiber 205a and fiber 205b connecting router 203 and spine switch 209. Router 203 may be a high capacity switch that switches one or more media access control (MAC) frames encoded in an optical data signal. Fiber 205a may be 100 gigabit (100G) optical fiber. Fiber 205b may be 100 gigabit (100G) optical fiber. STC 207 may further comprise aggregation switch 213 and may be connected to spine switch 209 via fiber 211a and fiber 211b. Fiber 211a may be 100 gigabit (100G) optical fiber. Fiber 211b may be 100 gigabit (100G) optical fiber. STC 207 may further comprise a cable modem termination system (CMTS) 217. CMTS 217 may provide high-speed data services, such as cable Internet or Voice over Internet Protocol, or video to RPDs 231a, 231b, 233a, 233b, 235a, 235b. Aggregation switch 213 may be connected to CMTS 217 via fiber 215a and fiber 215b. Fiber 215a may be 10 gigabit (10G) optical fiber. Fiber 215b may be 10 gigabit (10G) optical fiber. CMTS 217 may be connected to video equipment 219 via a one or more cable connections. Video equipment 219 may include video media that customers may request via RPDs 231a, 231b, 233a, 233b, 235a, 235b. STC 207 may also comprise leaf switch 223. Leaf switch 223 may be connected to spine switch 209 via fiber 221a and fiber 221b. Fiber 221a may be 100 gigabit (100G) optical fiber. Fiber 221b may be 100 gigabit (100G) optical fiber. Leaf switch 223 may be a switch that switches between one or more OCMLs For example leaf switch 223 may switch MAC frames received from a service provider connected to Metro Coherent DWDM via spine switch 209 through OCML 225a, OCML 225b, or OCML 225c. OCML 225a, OCML 225b, or OCML 225c may be referred to as access OCMLs. It should be noted that the number of OCMLs is not limited to the three in FIG. 2. There may be more than three OCMLs connected to leaf switch 223. Leaf switch 223 may be connected to OCML 225a via a twelve-channel 10G optical fiber. Leaf switch 223 may be connected to OCML 225b via a twelve-channel 10G optical fiber. Leaf switch 223 may be connected to OCML 225c via a twelve-channel 10G optical fiber. Outside plant 239 may comprise MDM 229*a*, MDM 229*b*, and MDM 229*c* and RPDs 231*a*, 231*b*, 233*a*, 233*b*, 235*a*, 235*b*. STC 207 may be connected to outside plant 239 via DWDM 227*a*, DWDM 227*b*, and DWDM 227*c*. DWDM 227*a*, DWDM 227*b*, and DWDM 227*c* may each include a primary fiber and a secondary fiber, both of which may be 10G fibers. Spine switch 209 may be a switch that performs routing within the metro coherent DWDM 201. In some embodiments, there may be a plurality of spine switches and a plurality of leaf switches. Each and every leaf switch of the plurality of leaf switches may be connected to each and every spine switch of the plurality of spine switches. That is, a full mesh network may be created between the one or more of the spine switches and all of the leaf switches. For example, there may be three spine switches and three leaf switches, and a first spine switch may be connected to each of the leaf switches. A second spine switch may only be connected to two leaf switches, and a third spine switch may be connected to all three leaf switches. Leaf switch 223 may comprise one or more access switches that connect to devices such as servers, firewalls, load balancers, and edge routers.

Figure 3:
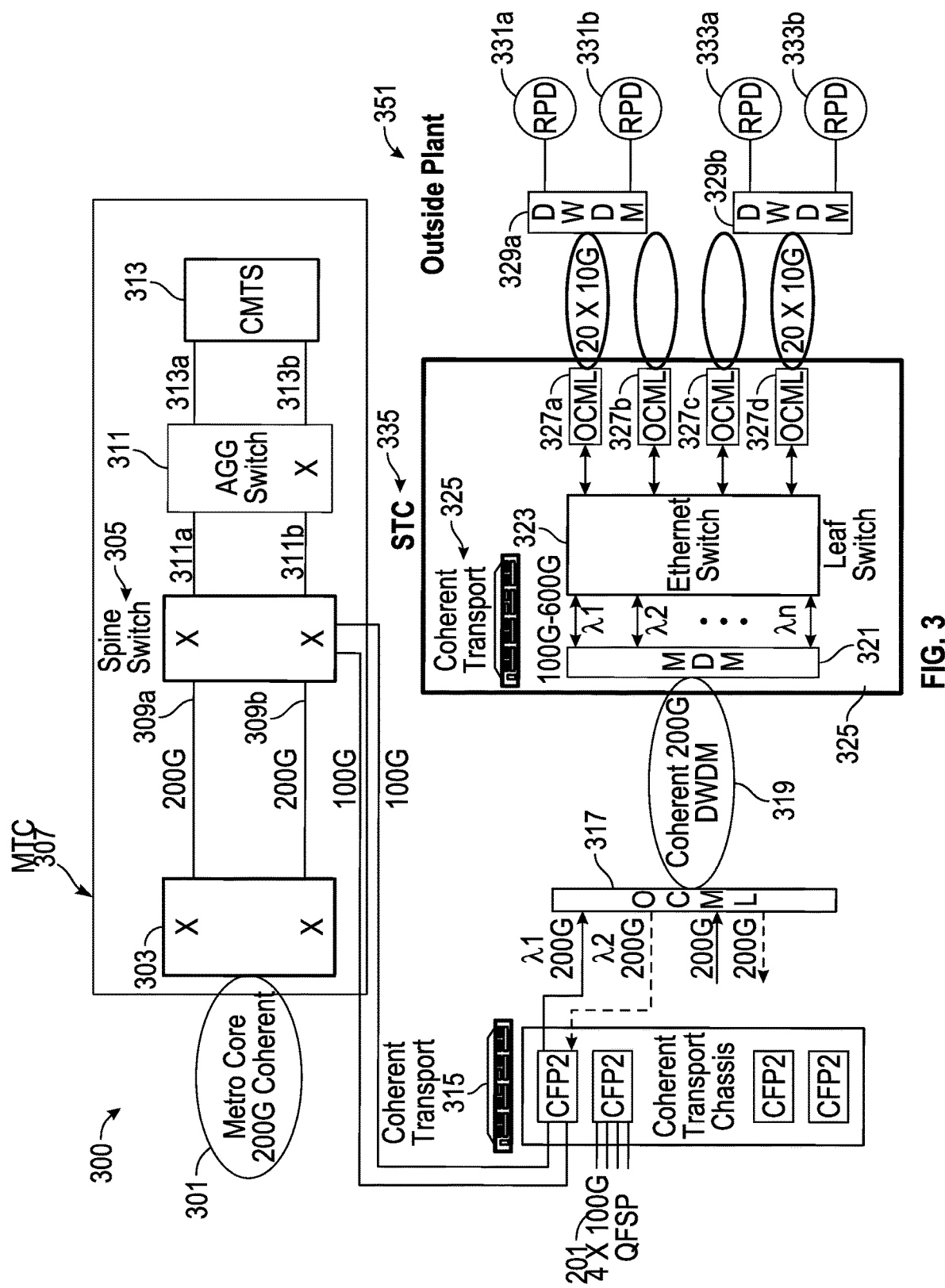
FIG. 3 depicts a network architecture including an optical communication module link extender (OCML) backhaul STC and master terminal center (MTC), in accordance with the disclosure.

FIG. 3 depicts a network architecture including an optical communication module link extender (OCML) backhaul STC and master terminal center (MTC), in accordance with the disclosure. In some embodiments, the coherent OCML backhaul may be implemented according to network architecture 300. Metro Coherent DWDM 301 may be a coherent Multi-Layer Metro Regional Network similar to Multi-Layer Metro Regional Network 104 in functionality. MTC 307 may comprise router 303, spine switch 305, and fiber 309*a* and fiber 309*b* connecting router 303 and spine switch 305. Fiber 309*a* may be 100 gigabit (100G) optical fiber. Fiber 309*b* may be 100 gigabit (100G) optical fiber. MTC 307 may further comprise aggregation switch 311 and may be connected to spine switch 305 via fiber 311*a* and fiber 311*b*. Fiber 311*a* may be 100 gigabit (100G) optical fiber. Fiber 311*b* may be 100 gigabit (100G) optical fiber. MTC 307 may further comprise a cable modem termination system (CMTS) 313. CMTS 313 may provide high-speed data services, such as cable Internet or Voice over Internet Protocol, or video to RPDs 331*a*, 331*b*, 333*a*, and 333*b*. Aggregation switch (AGG switch) 311 may be connected to CMTS 313 via fiber 313*a* and fiber 313*b*. Fiber 313*a* may be 10 gigabit (10G) optical fiber. Fiber 313*b* may be 10 gigabit (10G) optical fiber. Spine switch 305 may be connected to coherent transport 315 via fiber 315*a* and fiber 315*b*. Fiber 315*a* may be 100 gigabit (100G) optical fiber. Fiber 315*b* may be 100 gigabit (100G) optical fiber. Spine switch 305 may be connected to coherent transport 315 with quad small form-factor pluggable (QSFP) transceivers in coherent transport 315. Coherent transport 315 may transmit high capacity optical data signals to an OCML backhaul that is 10 kilometers away. A high capacity optical data signal may be an optical data signal that carries a greater amount of information than the capacity or a typical optical data signal. For example, a typical optical data signal may have the capacity to support data associated with audio, voice, and video. Whereas a high capacity optical data signal may have a capacity that supports streaming data such as streaming video game data. Coherent transport 315 may include a plurality of C form-factor pluggable (CFP) transceivers each of which may interface with four quad small form-factor pluggable transceivers. Spine switch 305 may be connected to at least one CFP2. Each of the four quad small form-factor pluggable transceivers may carry a 100G optical data signal.

Accordingly, there may be four separate 100G optical data signals received by each CFP2, or transmitted by each CFP2.

Coherent transport 315 may be connected to OCML 317, and there may be a wavelength carrying a 200G optical data signal from coherent transport 315 to OCML 317, and a wavelength carrying a 200G optical data signal from OCML 317 to coherent transport 315 for each CFP2 in coherent transport 315. MTC 307 may be connected to STC 335 via coherent 200G DWDM 319. That is OCML 317 may be connected to MDM 321.

MDM 321 may be connected to coherent transport 325. Coherent transport 325 may be connected to leaf switch 323 via a plurality of ports, each of which may transport an optical data signal with a certain wavelength and data rate between 100G and 600G. Leaf switch 323 may be similar in functionality to leaf switch 223. And spine switch 305 may be similar in functionality to spine switch 209. Leaf switch 323 may be connected to OCML 327*a*, OCML 327*b*, OCML 327*c*, and OCML 372*d*. OCML 327*a*, OCML 327*b*, OCML 327*c*, and OCML 372*d* may be referred to access OCMLs or Backhaul OCMLs.

Outside plant 351 may comprise DWDM 329*a* DWDM 329B and RPDs 331*a*, 331*b*, 333*a*, . . . 333*b*. OCML 3237 may be connected to DWDM 329*a* via a twenty-wavelength 10G connection. OCML 327*b* may be connected to a DWDM (not pictured here) via a twenty-wavelength 10G connection. OCML 327*c* may be connected to DWDM (not pictured here) via a twenty-wavelength 10G connection. OCML 327*d* may be connected to DWDM 329*b* via a twenty-wavelength 10G connection. The OCMLs in the STC transport, or backhaul, coherent optical data signals from the outside plant to the OCML in the MTC. That is OCMLs 327*a*, 327*b*, 327*c*, 327*d* backhaul coherent optical data signals that they receive from outside plant 351, to OCML 317 via coherent 200G DWDM 319.

Spine switch 305 may be a switch that performs routing within the metro coherent DWDM 301. In some embodiments, there may be a plurality of spine switches and a plurality of leaf switches. Each and every leaf switch of the plurality of leaf switches may be connected to each and every spine switch of the plurality of spine switches. That is a full mesh network may be created between the one or more of the spine switches and all of the leaf switches. For example, there may be three spine switches and three leaf switches, and a first spine switch may be connected to each of the leaf switches. A second spine switch may only be connected to two leaf switches, and a third spine switch may be connected to all three leaf switches. Leaf switch 323 may comprise one or more access switches that connect to devices such as servers, firewalls, load balancers, and edge routers.

Figure 4:
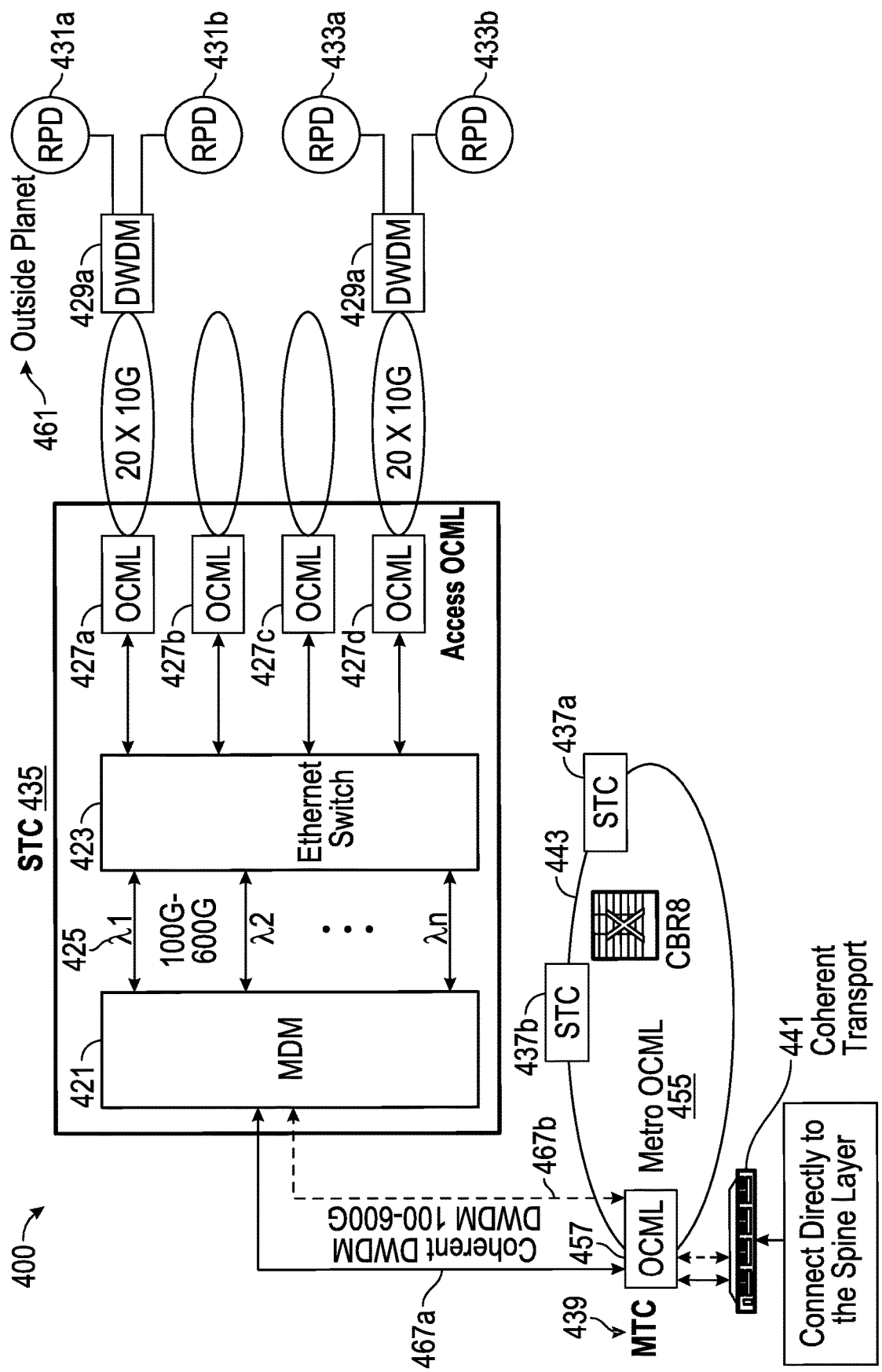
FIG. 4 depicts a network architecture including (OCML) backhaul STCs and a MTC, in accordance with the disclosure.

FIG. 4 depicts a network architecture including (OCML) backhaul STCs and a MTC, in accordance with the disclosure. In some embodiments, the coherent OCML may be implemented according to network architecture 400. Metro OCML 455 may be a coherent Multi-Layer Metro Regional Network similar to Multi-Layer Metro Regional Network 104 in functionality. MTC 439 may be similar in functionality to MTC 307. OCML 457 may be in MTC 439 and may be similar in functionality to OCML 317. OCML 457 may be connected to coherent transport 441, and coherent transport 441 may be similar in functionality to coherent transport 315. Metro OCML 455 is a network of STCs (STC 437*b*, STC 437*a*, and STC 435) connected to an MTC (MTC 439) via fiber 443. OCML 457 may be connected to MDM 421 via fiber 467*a* and fiber 467*b*. Fiber 467*a* may carry coherent DWDM optical data signals from the DWDM in OCML 457. The DWDM supports 100G-600G optical data signals. Fiber 467b may be a coherent DWDM where the DWDM supports 100G-600G optical data signals. The OCMLs in the STC transport, or backhaul, coherent optical data signals from the outside plant to the OCML in the MTC. That is OCMLs 427a, 427b, 427c, 427d backhaul coherent optical data signals that they receive from outside plant 461, to OCML 457 via fiber 467a or 467b.

MDM 421 may be connected to coherent transport 425. Coherent transport 425 may be connected to leaf switch 423 via a plurality of ports, each of which may transport an optical data signal with a certain wavelength and data rate between 100G and 600G. Leaf switch 423 may be similar in functionality to leaf switch 223. Leaf switch 423 may be connected to OCML 427a, OCML 427b, OCML 427c, and OCML 472d. OCML 427a, OCML 427b, OCML 427c, and OCML 472d may be referred to access OCMLs or Backhaul OCMLs.

Outside plant 461 may comprise DWDM 429a DWDM 429B and RPDs 431a, 431b, 433a, . . . 433b. OCML 4237 may be connected to DWDM 429a via a twenty-wavelength 10G connection. OCML 427b may be connected to a DWDM (not pictured here) via a twenty-wavelength 10G connection. OCML 427c may be connected to DWDM (not pictured here) via a twenty-wavelength 10G connection. OCML 427d may be connected to DWDM 429b via a twenty-wavelength 10G connection.

STC 437b and STC 437a may be similar in functionality to STC 435, and MTC 439 may be connected to STC 437a and STC 437b in much the same way that MTC 439 is connected to STC 435. STC 437b may be connected to an outside plant, and STC 437a may also be connected to an outside plant.

Figure 5:
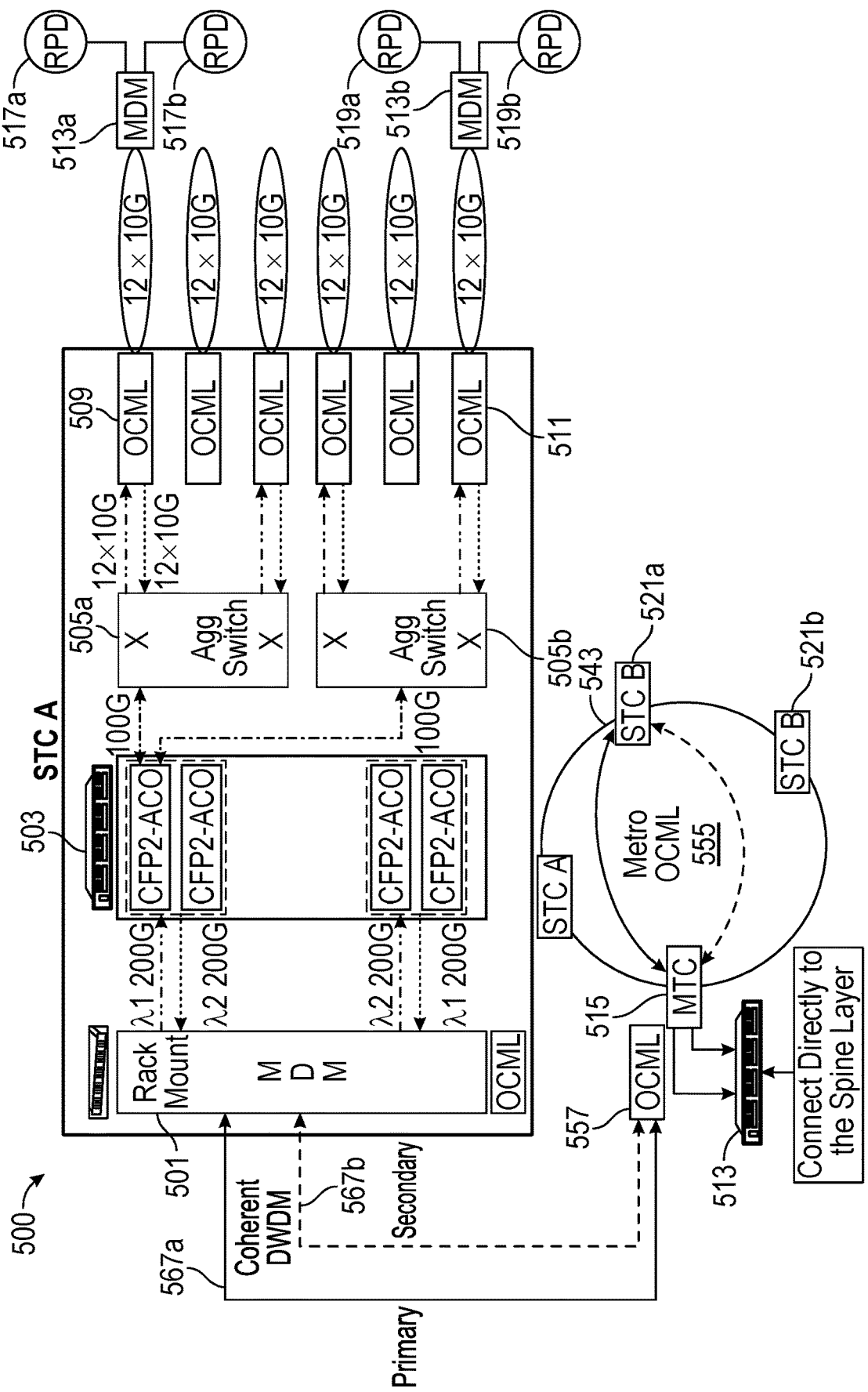
FIG. 5 depicts a network architecture including (OCML) backhaul STCs and a MTC, in accordance with the disclosure.

FIG. 5 depicts a network architecture including (OCML) backhaul STCs and a MTC, in accordance with the disclosure. In some embodiments, the coherent OCML may be implemented according to network architecture 500. Metro OCML 555 may be a coherent Multi-Layer Metro Regional Network similar to Multi-Layer Metro Regional Network 104 in functionality. MTC 515 may be similar in functionality to MTC 307. OCML 457 may be in MTC 515 and may be similar in functionality to OCML 317. OCML 557 may be connected to coherent transport 513, and coherent transport 513 may be similar in functionality to coherent transport 315. Metro OCML 455 is a network of STCs (STC 52aa, 521b, and 521c) connected to an MTC (MTC 515) via fiber 543. OCML 557 may be connected to MDM 501 via fiber 567a and fiber 567b. Fiber 567a may be a coherent DWDM where the DWDM supports 100G-600G optical data signals. The OCMLs in the STC transport, or backhaul, coherent optical data signals from the outside plant to the OCML in the MTC. That is OCMLs 509 and 511 backhaul coherent optical data signals that they receive from an outside plant comprising MDMs 513a and 513b, to OCML 557 via fiber 567a or 567b.

MDM 501 may be connected to coherent transport 503. Coherent transport 503 may comprise a plurality of C form-factor pluggable analog coherent circuits (CFP2-ACO) transceivers. Each of the CFP2-ACO transceivers may be connected to a port in MDM 501. The connection between one CFP2-ACO transceiver and one port in MDM 501 may support a 200G optical data signal on a given wavelength. More specifically, there may be a wavelength for a 200G optical data signal transported from a port in MDM 501 to a CFP2-ACO transceiver. There may be a wavelength for a 200G optical data signal transported from the same CFP2-ACO transceiver to the port in MDM 501. This relationship may hold between a single port, of the plurality of ports in MDM 501, and one CFP2-ACO in coherent transport 503. There may be a first port in each CFP2-ACO connected to leaf switch 505a, and a second port in each CFP2-ACO connected to leaf switch 505b. Leaf switch 505a may be connected to a first plurality of OCMLs (OCMLs 509). Leaf switch 505b may be connected to a second plurality of OCMLs (OCMLs 511). Leaf switch 505a may include a unique port, for every OCML in OCMLs 509 that transports twelve 10G optical data signals from the unique port to a given OCML in OCMLs 509. Each OCML in OCMLs 509 may transport twelve 10G optical signals to a unique port in leaf switch 505a. Leaf switch 505b may include a unique port, for every OCML in OCMLs 511 that transports twelve 10G optical data signals from the unique port to a given OCML in OCMLs 511. Each OCML in OCMLs 511 may transport twelve 10G optical signals to a unique port in leaf switch 505b.

Each OCML in OCMLs 509 may be connected to an MDM. For instance, the topmost OCML of OCMLSs 509 may be connected to MDM 513a. MDM 513 may be connected to RPD 517a and RPD 517b. The bottommost OCML of OCMLs 511 may be connected to MDM 513b, and MDM 513b may be connected to RPD 519a and RPD 519b. OCMLs 509 and OCMLs 511 may be referred to access OCMLs or Backhaul OCMLs.

Figure 6:
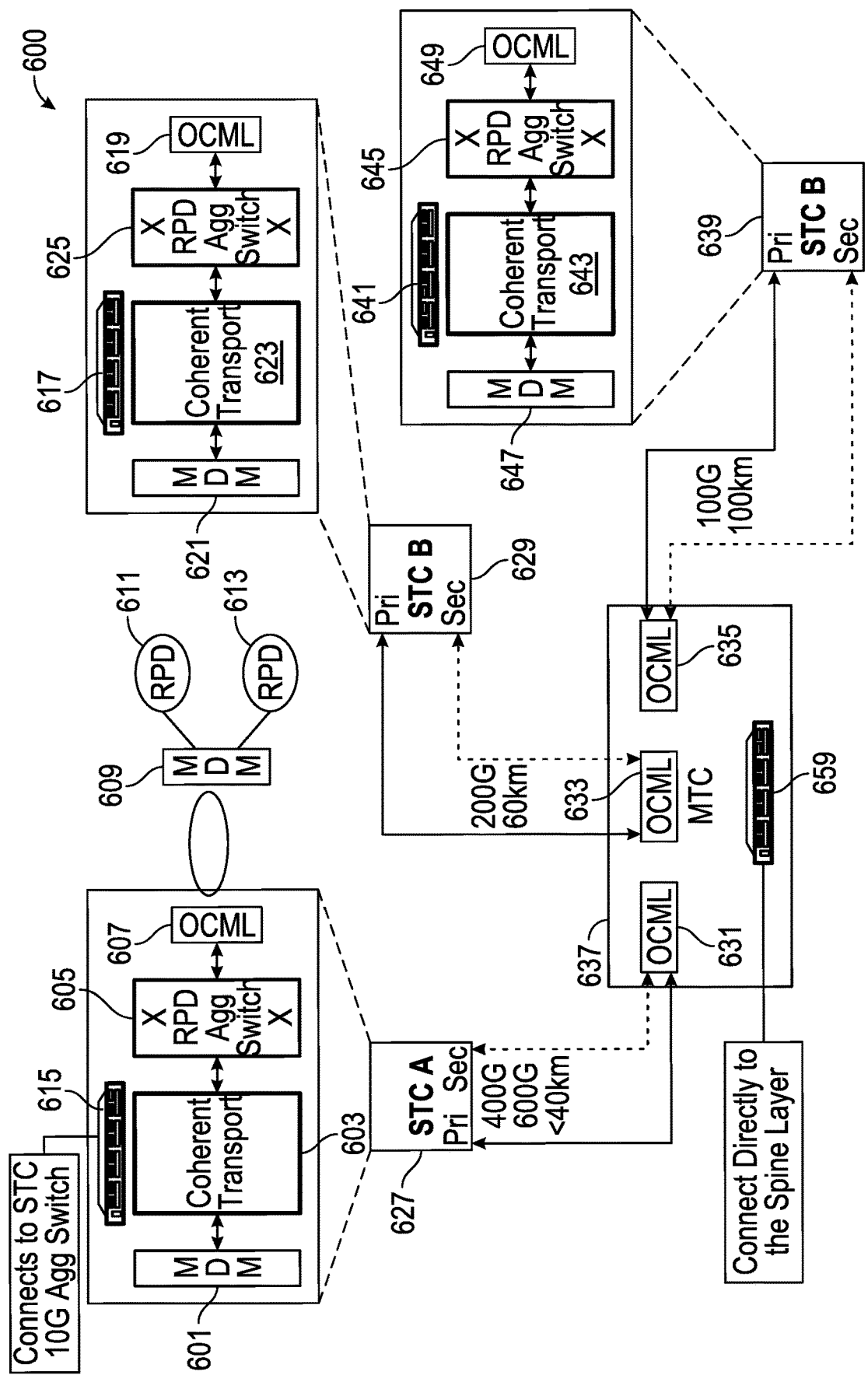
FIG. 6 depicts a network architecture including (OCML) backhaul STCs and a MTC, in accordance with the disclosure.

FIG. 6 depicts a network architecture including (OCML) backhaul STCs and a MTC, in accordance with the disclosure. In some embodiments, the coherent OCML may be implemented according to network architecture 600. MTC 637 may be similar in functionality to MTC 307. OCML 631, OCML 633, and OCML 635 may be in MTC 637 and may be similar in functionality to OCML 317. OCML 631, OCML 633, and OCML 635 may be connected to coherent transport 659. OCML 631 may be connected to STC A 627 via a primary and secondary fiber, both of which may carry 400G and/or 600G optical data signals. The primary and secondary fiber may be 40 kilometers in length.

OCML 631 may be connected to STC A 627 via MDM 601. OCML 633 may be connected to STC B 629 via a primary and secondary fiber, both of which may carry 200G optical data signals. The primary and secondary fiber may be 60 kilometers in length. MDM 601 may be connected to coherent transport 603. Coherent transport 603 may be similar in functionality to coherent transport 315. Coherent transport 603 may be connected to leaf switch 615, and coherent transport 603 may be connected to remote physical device (RPD) switch 605. RPD aggregation switch 605 may be connected to OCML 607. RPD aggregation switch 605 may be a leaf switch. OCML 607 may be connected to MDM 609, and MDM 609 may be connected to RPD 611 and RPD 613.

OCML 633 may be connected to STC B 629 via MDM 621. MDM 621 may be connected to coherent transport 623. Coherent transport 623 may be similar in functionality to coherent transport 315. Coherent transport 623 may be connected to leaf switch 617, and coherent transport 623 may be connected to remote physical device (RPD) switch 625. RPD aggregation switch 625 may be connected to OCML 619. RPD aggregation switch 625 may be a leaf switch. OCML 619 may be connected to an MDM (not shown), and the MDM may be connected to a plurality of RPDs (not shown).

OCML 635 may be connected to STC C 629 via MDM 621. OCML 635 may be connected to STC C 639 via a primary and secondary fiber, both of which may carry 100G optical data signals. The primary and secondary fiber may be 100 kilometers in length. MDM 647 may be connected to coherent transport 643. Coherent transport 643 may be similar in functionality to coherent transport 315. Coherent transport 643 may be connected to leaf switch 641, and coherent transport 643 may be connected to remote physical device (RPD) switch 645. RPD aggregation switch 645 may be connected to OCML 649. RPD aggregation switch 645 may be a leaf switch. OCML 649 may be connected to an MDM (not shown), and the MDM may be connected to a plurality of RPDs (not shown). OCML 607, OCML 619, and OCML 649 may be referred to access OCMLs or Backhaul OCMLs. The OCMLs in the STC transport, or backhaul, coherent optical data signals from the outside plants associated with STC A 627, STC B 629, and STC C 639, to the OCML in the MTC. That is OCMLs 607, 619, and 649 backhaul coherent optical data signals that they receive from their respective outside plants to OCMLs 631, 633, and 635 respectively.

Figure 7A:
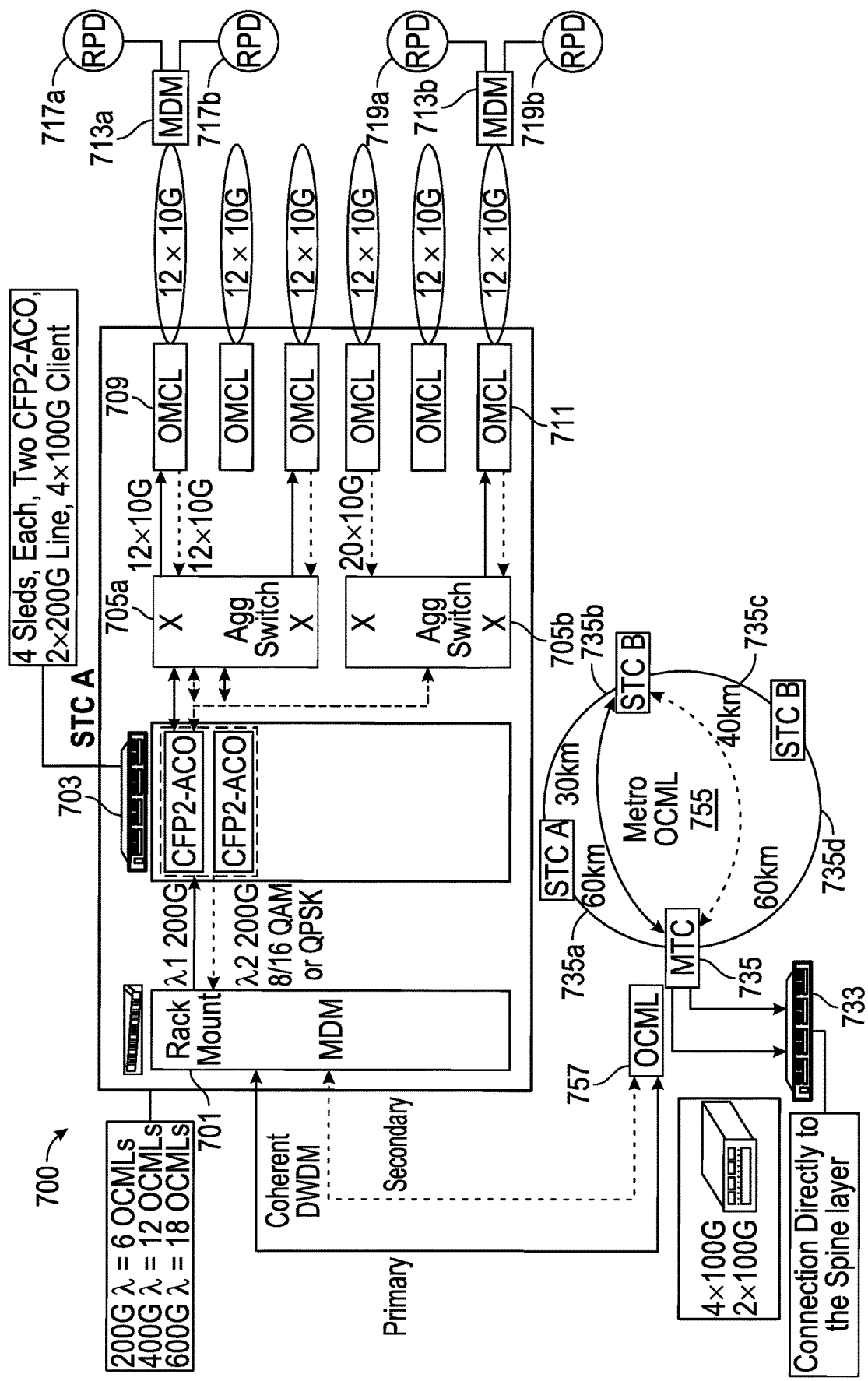
FIG. 7A depicts a network architecture including (OCML) backhaul STCs and a MTC, in accordance with the disclosure.

FIG. 7A depicts a network architecture including (OCML) backhaul STCs and a MTC, in accordance with the disclosure. In some embodiments, the coherent OCML may be implemented according to network architecture 700. Metro OCML 755 may be a coherent Multi-Layer Metro Regional Network similar to Multi-Layer Metro Regional Network 104 in functionality. MTC 635 may be similar in functionality to MTC 307. OCML 757 may be in MTC 735 and may be similar in functionality to OCML 317. OCML 757 may be connected to coherent transport 733, and coherent transport 733 may be similar in functionality to coherent transport 315. Metro OCML 755 is a network of STCs (STC A, STC B, and STC C) connected to an MTC (MTC 515) via fibers 735a, 735b, 735c, and 735d. STC A may be connected to MTC 358 via fiber 735a, and fiber 735a may be 60 kilometers in length. STB may be connected to STC A via fiber 735b, and fiber 735b may be 30 kilometers in length. STC B may be connected to STC C via fiber 735c, and fiber 735c may be 40 kilometers in length. STC C may be connected to MTC 735 via fiber 735d, and fiber 735d may be 60 kilometers in length.

OCML 757 may be connected to MDM 701 via fiber 767a and fiber 767b. Fiber 767a may be a coherent DWDM where the DWDM supports 100G-600G optical data signals.

MDM 701 may be connected to coherent transport 703. Coherent transport 703 may comprise a plurality of C form-factor pluggable analog coherent circuits (CFP2-ACO) transceivers. Each of the CFP2-ACO transceivers may be connected to a port in MDM 701. The connection between one CFP2-ACO transceiver and one port in MDM 701 may support a 200G optical data signal on a given wavelength. More specifically, there may be a wavelength for a 200G optical data signal transported from a port in MDM 701 to a CFP2-ACO transceiver. There may be a wavelength for a 200G optical data signal transported from the same CFP2-ACO transceiver to the port in MDM 701. This relationship may hold between a single port, of the plurality ports in MDM 701, and one CFP2-ACO in coherent transport 703. There may be a first port in each CFP2-ACO connected to leaf switch 705a, and a second port in each CFP2-ACO connected to leaf switch 705b. Leaf switch 705a may be connected to a first plurality of OCMLs (OCMLs 709). Leaf switch 705b may be connected to a second plurality of OCMLs (OCMLs 711). Leaf switch 705a may include a unique port, for every OCML in OCMLs 709 that transports twelve 10G optical data signals from the unique port to a given OCML in OCMLs 709. Each OCML in OCMLs 709 may transport twelve 10G optical signals to a unique port in leaf switch 705a. Leaf switch 705b may include a unique port, for every OCML in OCMLs 711 that transports twelve 10G optical data signals from the unique port to a given OCML in OCMLs 711. Each OCML in OCMLs 711 may transport twelve 10G optical signals to a unique port in leaf switch 705b.

Each OCML in OCMLs 709 may be connected to an MDM. For instance, the topmost OCML of OCMLSs 709 may be connected to MDM 713a. MDM 713a may be connected to RPD 717a and RPD 717b. The bottommost OCML of OCMLs 711 may be connected to MDM 713b, and MDM 713b may be connected to RPD 719a and RPD 719b. OCMLs 709 and OCMLs 711 may be referred to access OCMLs or Backhaul OCMLs.

Figure 7B:
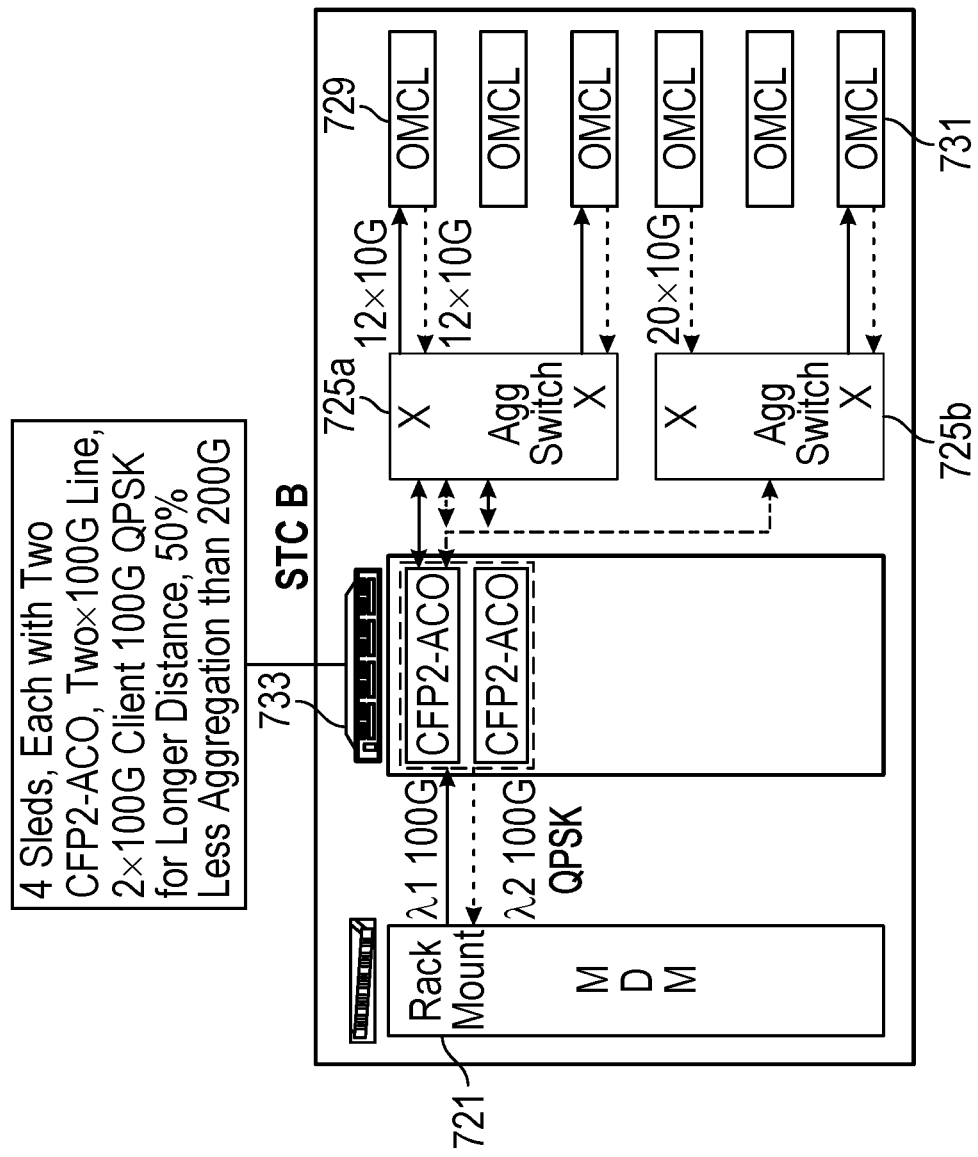
FIG. 7B depicts a network architecture including (OCML) backhaul STCs and a MTC, in accordance with the disclosure.

FIG. 7B depicts a network architecture including (OCML) backhaul STCs and a MTC, in accordance with the disclosure. MDM 721 may be connected to coherent transport 733. Coherent transport 733 may comprise a plurality of C form-factor pluggable analog coherent circuits (CFP2-ACO) transceivers. Each of the CFP2-ACO transceivers may be connected to a port in MDM 721. The connection between one CFP2-ACO transceiver and one port in MDM 721 may support a 200G optical data signal on a given wavelength. More specifically, there may be a wavelength for a 200G optical data signal transported from a port in MDM 701 to a CFP2-ACO transceiver. There may be a wavelength for a 200G optical data signal transported from the same CFP2-ACO transceiver to the port in MDM 721. This relationship may hold between a single port, of the plurality ports in MDM 721, and one CFP2-ACO in coherent transport 733. There may be a first port in each CFP2-ACO connected to leaf switch 725a, and a second port in each CFP2-ACO connected to leaf switch 725b. Leaf switch 705a may be connected to a first plurality of OCMLs (OCMLs 729). Leaf switch 705b may be connected to a second plurality of OCMLs (OCMLs 731). Leaf switch 725a may include a unique port, for every OCML in OCMLs 729 that transports twelve 10G optical data signals from the unique port to a given OCML in OCMLs 729. Each OCML in OCMLs 729 may transport twelve 10G optical signals to a unique port in leaf switch 725a. Leaf switch 725b may include a unique port, for every OCML in OCMLs 712 that transports twelve 10G optical data signals from the unique port to a given OCML in OCMLs 731. Each OCML in OCMLs 711 may transport twelve 10G optical signals to a unique port in leaf switch 725b. OCMLs 729 and OCMLs 731 may be referred to access OCMLs or Backhaul OCMLs. The OCMLs in the STC transport, or backhaul, coherent optical data signals from the outside plants associated with STC A 799 and STC B 797, to the OCML in the MTC. That is OCMLs 709 and 711 in STC A 799 and OCMLs 729 and 731 in STC B 797 backhaul coherent optical data signals that they receive from their respective outside plants to OCML 757 respectively. STC A 799 may be connected to an outside plant with MDMs 713a and 719b.

What is claimed is:

1. A system for transporting an optical data signal comprising:
   a master terminal center (MTC) in a metro regional network comprising a spine switch;
   a first secondary transport center (STC) in the metro regional network comprising an optical communications module link extender (OCML), wherein the spine switch of the MTC is connected to a leaf switch of the first STC via a coherent transport connection;
   a second secondary transport center (STC) in the metro regional network comprising an optical communications module link extender (OCML), wherein the first STC is communicatively coupled between the second STC and the MTC, wherein the second STC is configured to directly communicate with the MTC without sending signals through the first STC; and an access OCML connected to the leaf switch, wherein the access OCML is connected to a dense wave division multiplexer (DWDM) in a remote physical device.

2. The system of claim 1, wherein the coherent transport connection is a bidirectional connection.

3. The system of claim 1, wherein a coherent transport device receives a plurality of 100 gigabit (100G) optical data signals from the spine switch, and the coherent transport device outputs a 600G optical data signal to the OCML.

4. The system of claim 1, wherein the MTC further comprises a cable modem termination system (CMTS).

5. The system of claim 4, wherein the MTC further comprises an aggregation switch connected to the CMTS.

6. The system of claim 5, wherein the aggregation switch is connected to a coherent transport device.

7. The system of claim 6, wherein the coherent transport device comprises one or more c-form factor pluggable transceivers.

8. The system of claim 1, wherein the STC further comprises a multiplexer-demultiplexer (MDM) connected to the leaf switch.

9. The system of claim 8, wherein the MDM is connected to the OCML via the DWDM connection.

10. The system of claim 1, wherein the STC further comprises an outside plant, wherein a remote physical device is located in the outside plant.

11. The system of claim 1, wherein the MTC further comprises a router connecting the spine switch to a metro core multigigabit coherent network.

12. A method for transporting an optical data signal comprising:

transmitting, by a master terminal center (MTC) in a metro regional network comprising a spine switch, the optical data signal to a coherent transport chassis;

transmitting, by the coherent transport chassis, the optical data signal to a leaf switch of a first secondary terminal center (STC) in a metro regional network, wherein the metro regional network further comprises a second secondary transport center (STC) comprising an optical communications module link extender (OCML), wherein the first STC is communicatively coupled between the second STC and the MTC, wherein the second STC is configured to directly communicate with the MTC without sending signals through the first STC;

transmitting, by the leaf switch, the optical data signal to an optical communications module link extender (OCML) in the STC; and transmitting, by the OCML, the optical data signal to a dense wave division multiplexer (DWDM).

13. The method of claim 12, wherein the coherent transport chassis receives a plurality of 100 gigabit (100G) optical data signals from the spine switch, and the coherent transport chassis outputs a 600G optical data signal to the OCML.

14. The method of claim 12, wherein the MTC further comprises a cable modem termination system (CMTS).

15. The method of claim 14, wherein the MTC further comprises an aggregation switch connected to the CMTS.

16. The method of claim 12, wherein the coherent transport chassis comprises one or more c-form factor pluggable transceivers.

17. The method of claim 12, wherein the STC further comprises a multiplexer-demultiplexer (MDM) connected to the leaf switch.

18. The method of claim 17, wherein the MDM is connected to the OCML via a DWDM connection.

19. The method of claim 12, wherein the STC further comprises an outside plant, wherein a remote physical device is located in the outside plant.

20. The method of claim 12, wherein the MTC further comprises a router connecting the spine switch to a metro core multigigabit coherent network.

* * * * *